(12) United States Patent
Nishio et al.

(10) Patent No.: US 7,402,359 B2
(45) Date of Patent: Jul. 22, 2008

(54) POSITIVE TERMINAL FOR A DRY BATTERY AND BATTERY BOX EQUIPPED WITH THE POSITIVE TERMINAL

(75) Inventors: Atsushi Nishio, Ibaraki (JP); Yoshinori Ohta, Ibaraki (JP); Yasuhiko Shinohara, Ibaraki (JP)

(73) Assignee: Mitsumi Electric Co., Ltd, Tokyo (JP)

( * ) Notice: Subject to any disclaimer, the term of this patent is extended or adjusted under 35 U.S.C. 154(b) by 635 days.

(21) Appl. No.: 10/931,334

(22) Filed: Aug. 31, 2004

(65) Prior Publication Data

US 2005/0095501 A1 May 5, 2005

(30) Foreign Application Priority Data

Oct. 30, 2003 (JP) ............................. 2003-371173

(51) Int. Cl.
*H01M 2/10* (2006.01)
(52) U.S. Cl. ...................................... 429/100
(58) Field of Classification Search ................. 429/96, 429/100
See application file for complete search history.

(56) References Cited

U.S. PATENT DOCUMENTS 6,293,819 B1 * 9/2001 Wu ......................... 429/100 X
7,141,330 B2 * 11/2006 Aoyama ................... 429/100 X
7,255,959 B2 * 8/2007 Chan ........................... 429/100

\* cited by examiner

*Primary Examiner*—Stephen J. Kalafut
(74) *Attorney, Agent, or Firm*—Patents & TMS, P.C.

(57) ABSTRACT

A positive terminal 20 for a dry battery of a battery box 1*a* includes an electrode portion 22 adapted to make contact with the anode of a battery, a soldering portion 13 soldered to the substrate 6, and a lead portion 21 integrally provided between the electrode portion 22 and the soldering portion 13. Further, a load absorbing means is provided in the lead portion 21 to prevent a force exerted in the longitudinal direction of the battery from being applied directly to the soldering portion 13. The lead portion 21 includes an extending part 21*a* which extends in the longitudinal direction of the battery and is continuous with the electrode portion 22, and a loop part 21*b* bent in a substantially ring shape and positioned within a plane roughly perpendicular to the longitudinal direction of the battery, wherein the loop part 21*b* forms the load absorbing means. According to the positive terminal described above, it is possible to prevent a damage of the substrate due to vibration or shock and to reduce a manufacturing cost of a battery box equipped with the positive terminal.

3 Claims, 3 Drawing Sheets

POSITIVE TERMINAL FOR A DRY BATTERY AND BATTERY BOX EQUIPPED WITH THE POSITIVE TERMINAL

This application claims the benefit of Japanese Patent Application No.: 2003-371173, filed Oct. 30, 2003.

BACKGROUND OF THE INVENTION

1. Field of the Invention

The present invention is related to a positive terminal for a dry battery and a battery box equipped with the positive terminal.

2. Description of the Prior Art

A prior art structure of a battery box is shown in FIG. 3. This battery box 1 includes a casing 2 having a cover 2a which can be opened and closed, a battery receiving portion 3 provided in the casing 2, a partition plate 4 integrally formed in the casing 2, mounting members 5 provided on the partition plate 4, a positive terminal 10 for a dry battery which includes an electrode portion 12 formed by bending one end portion of a steel wire into a roughly W shape and inserted in the mounting members 5, a substrate 6 soldered to the other end of the positive terminal 10, a storage capacitor 7 provided on the substrate 6, and a coil-shaped minus terminal 8. A cable 16 which extends from the battery box 1 includes a connector 17 provided at the tip thereof that is adapted to make a connection with a device (not shown in the drawing) such as a MD or the like to supply electricity to such device.

In order to achieve a simple structure for the battery box 1, the positive terminal 10 of the battery box 1 also serves as a lead wire that connects the electrode portion 12 to the substrate 6. A lead portion that serves as the lead wire is indicated by the reference numerals 11, and one end of this lead portion 11 forms a soldering portion which is soldered to the substrate 6 as shown by the reference number 13.

However, in the battery box 1 having the above structure, when the battery box 1 receives vibration or shock, a force due to the vibration or shock will cause the battery (not shown in the drawing) housed inside the battery box 1 to push against the electrode portion 12 of the positive terminal 10. As a result, the partition plate 4 will bend slightly, and at the same time, a load will be added to the substrate 6 through the lead portion 11 of the positive terminal 10.

This load concentrates at the soldering portion 13, thus resulting in the problems such as the formation of cracks in the substrate 6 at the soldering portion 13 and the wearing away of solder and the like.

It is thought that these problems can be solved by using a flexible wire conductor for the lead portion 11. However, because this in turn requires the use of an additional component separate from the electrode portion 12, the manufacturing cost will increase.

SUMMARY OF THE INVENTION

In view of the problems described above, it is an object of the present invention to provide a positive terminal for a dry battery which can prevent the substrate from being damaged due to vibration or shock, and which can be manufactured at a low cost.

Further, it is also an object of the present invention to provide a battery box equipped with such a positive terminal for a dry battery.

In order to achieve the object, the present invention is directed to A positive terminal for a dry battery, the positive terminal being formed by bending a conductive material made of a metallic wire into a predetermined shape, the positive terminal comprising: an electrode portion provided at one end portion of the metallic wire to which an anode of the dry battery is adapted to contact; a soldering portion provided at the other end portion of the metallic wire which is adapted to be soldered to a substrate; and a lead portion integrally provided between the electrode portion and the soldering portion, the leading portion being formed with load absorbing means for preventing a force exerted in the longitudinal direction of the dry battery from being directly applied to the soldering portion.

According to the positive terminal for a dry battery having the above structure, even if a battery is moved due to vibration or shock whereby a force is exerted to the positive terminal for a dry battery, the load applied to the substrate is absorbed by the load absorbing means of the lead portion. This makes it possible to prevent the damage of the substrate due to the vibration or shock, and also makes it possible to reduce the manufacturing cost.

Further, in the positive terminal for a dry battery according to the present invention, it is preferred that the lead portion comprises an extending part which is integrally coupled at one end thereof to the electrode portion to extend the longitudinal direction of the dry battery, and a curved loop part coupled between the other end of the extending part and the soldering portion, wherein the loop part acts as the load absorbing means.

By forming the load absorbing means from such a loop part, even if a force is applied to the positive terminal for a dry battery, the load is efficiently absorbed by the loop part, whereby enabling to prevent a damage of the substrate.

Furthermore, in the positive terminal for a dry battery according to the present invention, it is preferred that the electrode portion has a substantially W-shape configuration which is obtained by bending the one end portion of the metallic wire into a W shape, so that the electrode portion having the W-shaped configuration and the loop part are arranged in two spaced planes which are substantially parallel with each other.

By forming the positive terminal for a dry battery having such a structure, the loop part can be efficiently arranged inside the narrow space of the battery box.

Another aspect of the present invention is directed to a battery box for receiving at least one dry battery, which comprises: a casing for receiving at least one dry battery, the casing having one and the other end portions in its longitudinal direction; at least one negative terminal arranged in one end portion of the casing to which a cathode of the dry battery is adapted to contact when the dry battery is received in the casing; at least one positive terminal arranged in the other end portion of the casing, the positive terminal being formed by bending a conductive material made of a metallic wire into a predetermined shape; and a substrate arranged in the other end portion at a position near the positive terminal, wherein the positive terminal comprising an electrode portion provided at one end portion of the metallic wire to which the anode of the dry battery is adapted to contact, a soldering portion provided at the other end portion of the metallic wire and soldered to the substrate, and a lead portion provided between the electrode portion and the soldering portion, the leading portion being formed with load absorbing means for preventing a force exerted in the longitudinal direction of the dry battery from being directly applied to the soldering portion.

Further, in the battery box according to the present invention, it is preferred that the lead portion comprises an extending part which is integrally coupled at one end thereof to the electrode portion to extend in the longitudinal direction of the dry battery, and a curved loop part integrally coupled between the other end of the extending part and the soldering portion, wherein the curved part acts as the load absorbing means.

Further, in the battery box according to the present invention, it is also preferred that the electrode portion has a substantially W-shape configuration which is obtained by bending the one end portion of the metallic wire into a W-shape so that the positive electrode portion having the W-shaped configuration and the loop part are respectively arranged in two spaced planes which are substantially parallel with each other.

These and other objects, operations and effects of the present invention will be apparent from the following description of the preferred embodiments when it is considered taken in conjunction with the appended drawings.

BRIEF DESCRIPTION OF THE DRAWINGS

FIG. 2a to FIG. 2c respectively show a positive terminal for a dry battery used in the battery box shown in FIG. 1, in which FIG. 2a is a front view of the positive terminal, FIG. 2b is a right side view thereof, and FIG. 2c is a plan view thereof. Further, in FIG. 2c, a dashed line arrow A shows the longitudinal direction of the dry battery, and a dashed line arrow B shows a direction perpendicular to the longitudinal direction of the dry battery.

DETAILED DESCRIPTION OF THE PREFERRED EMBODIMENTS

The preferred embodiments of a positive terminal for a dry battery and a battery box equipped with the positive terminal according to the present invention will be described below with reference to the drawings.

Figure 1:
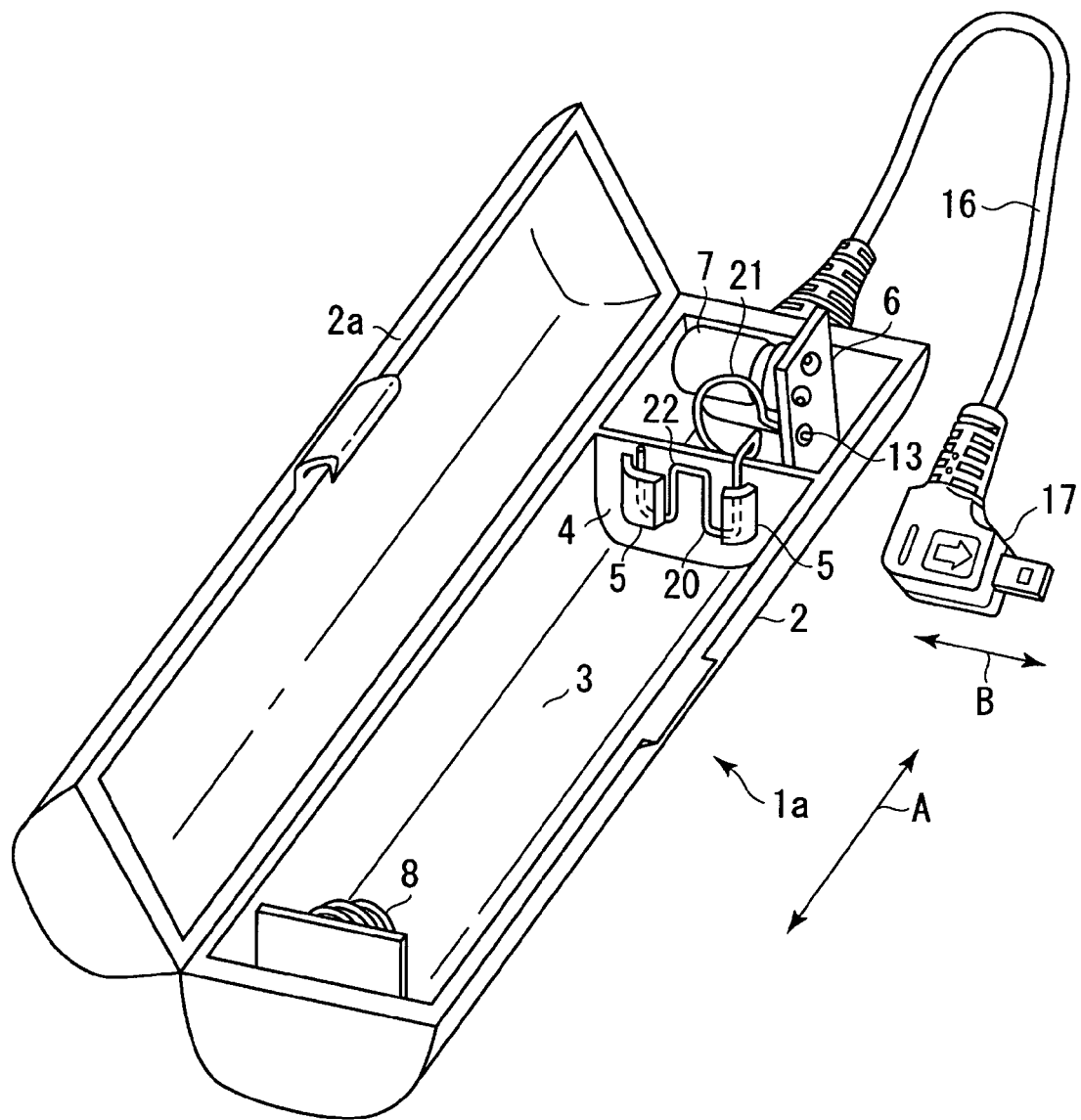
FIG. 1 is a perspective view showing the overall structure of a battery box equipped with a positive terminal for a dry buttery according to an embodiment of the present invention, in which an arrow A shows a longitudinal direction of a dry battery to be housed therein and an arrow B shows a direction perpendicular to the longitudinal direction A of the dry battery.
Figure 2A:
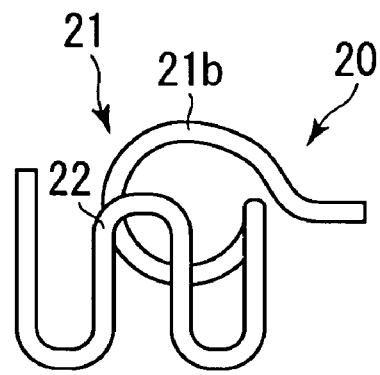
Figure 2B:
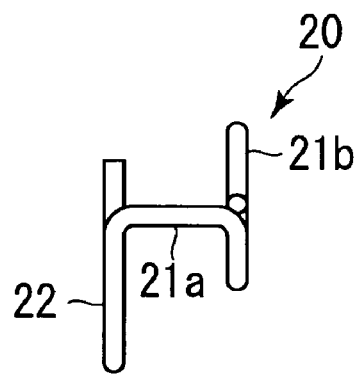
Figure 2C:
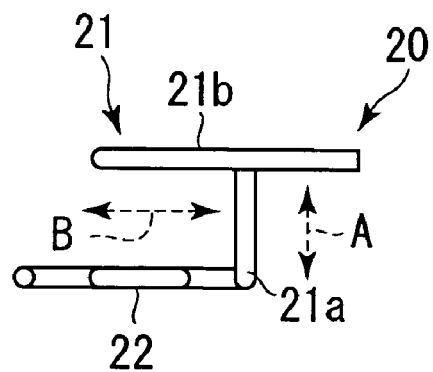
Figure 3:
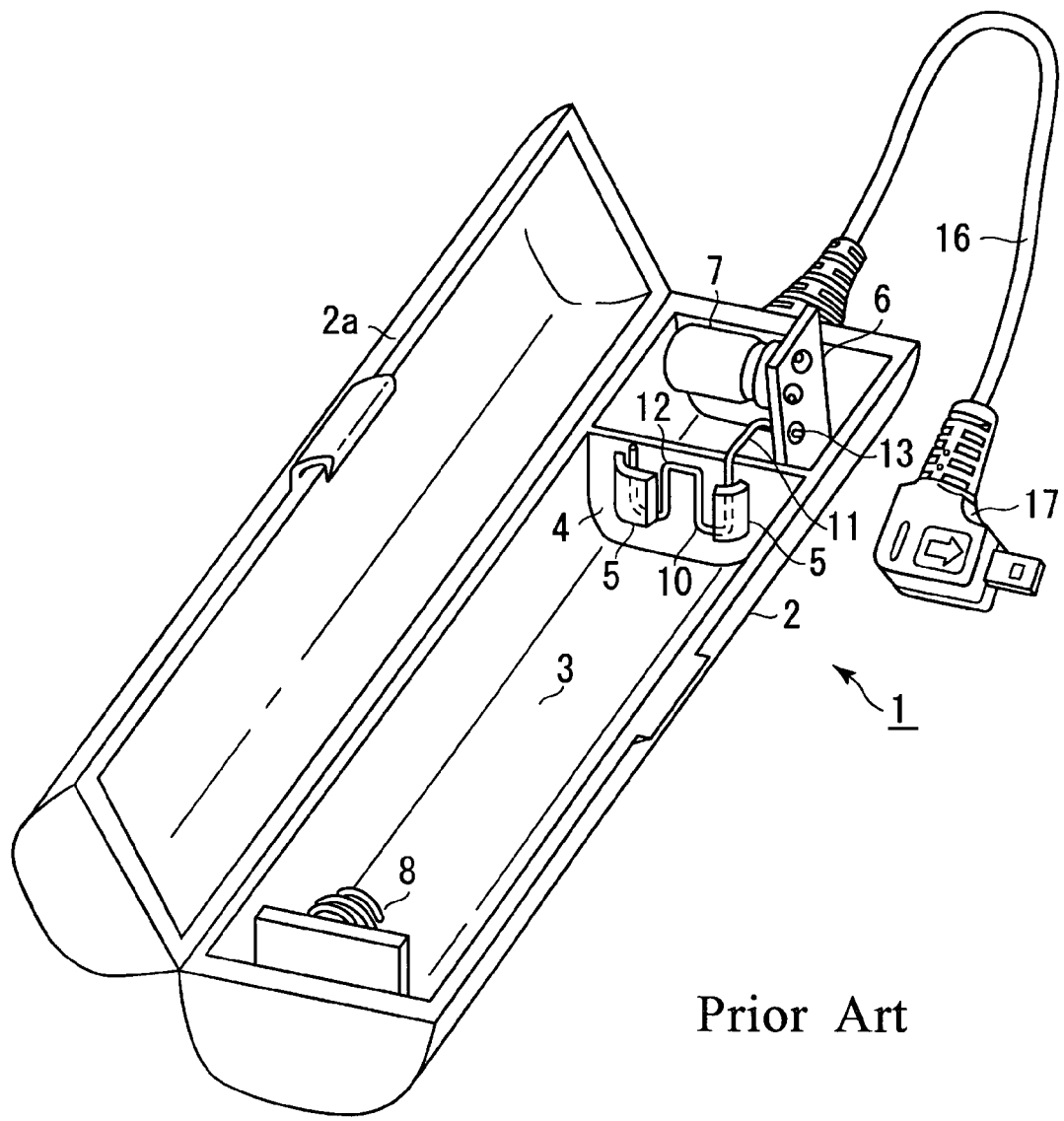
FIG. 3 is a perspective view showing the overall structure of a prior art battery box.

FIG. 1 is a perspective view showing the overall structure of a battery box equipped with a positive terminal for a dry buttery according to an embodiment of the present invention, in which an arrow A shows a longitudinal direction of a dry battery to be housed therein and an arrow B shows a direction perpendicular to the longitudinal direction of the dry battery. FIG. 2a to FIG. 2c respectively show a positive terminal 20 for a dry battery used in the battery box shown in FIG. 1, in which FIG. 2a is a front view of the positive terminal, FIG. 2b is a right side view thereof, and FIG. 2c is a plan view thereof. Further, in FIG. 2c, a dashed line arrow A shows the longitudinal direction of the dry battery, and a dashed line arrow B shows a direction perpendicular to the longitudinal direction of the dry battery. In this connection, please note that the same reference numbers are used for the components or portions which are the same as those of the prior art battery box 1 shown in FIG. 3.

As shown in FIG. 1, a battery box 1a of the present invention includes a casing 2 made of synthetic resin and having a cover 2a which can be opened and closed, a battery housing portion 3 provided in the casing 2, a partition plate 4 integrally formed in the casing 2, a mounting portion 5 formed from a pair of mounting members provided on the partition plate 4, a positive terminal 20 for a dry battery formed by bending one end portion of a metallic wire (steel wire in the present embodiment) into a predetermined shape, a substrate 6 soldered to the other end of the positive terminal 20 for a dry battery, a storage capacitor 7 provided on the substrate 6, and a coil-shaped minus terminal 8. A cable 16 which extends from the battery box 1a includes a connector 17 provided at the tip thereof that is adapted to make a connection with a device (not shown in the drawing) such as a MD or the like to supply electricity to such device.

The positive terminal 20 for a dry battery of the battery box 1a includes an electrode portion (terminal portion/positive electrode portion) 22 adapted to make contact with the anode of a battery (not shown in the drawings), a soldering portion 13 soldered to the substrate 6, and a lead portion 21 integrally provided between the electrode portion 22 and the soldering portion 13. Further, a load absorbing means is provided in the lead portion 21 to prevent a force exerted in the longitudinal direction of the battery from being applied directly to the soldering portion 13.

More specifically, the electrode portion 22 is formed by bending one end of the steel wire into a roughly W shape and it is mounted in the mounting portion 5 so that a portion of the conductor positioned between the pair of mounting members of the mounting portion 5 is adapted to make contact with the anode of a dry battery to be housed.

As shown in FIG. 1 and FIGS. 2a-2c, the lead portion 21 includes an extension part 21a which extends in the longitudinal direction of the battery and is continuous with the electrode portion 22, and a loop part (curved loop part) 21b bent into a substantially ring shape and positioned within a plane roughly perpendicular to the longitudinal direction of the dry battery, wherein the loop part 21b forms the load absorbing means of the present invention. Further, an end part of the loop part 21b at the side opposite the extension part 21a which constitutes the soldering portion 13 is connected and fixed to the substrate 6 by means of soldering. Namely, the loop part 21b is positioned within a vertical plane which is roughly perpendicular to both the longitudinal direction of the dry battery and the surface of the substrate 6.

As shown in FIG. 1 and FIGS. 2a-2c, the loop part 21b is formed by a bending process in which a part of the steel wire is bent into a substantially ring shape having a predetermined curvature as shown in FIG. 2a. As described above, the loop part 21b is positioned within a vertical plane which is roughly perpendicular to the longitudinal direction of the battery shown by the arrow A in FIG. 1, that is, within the vertical plane along the direction shown by the arrow B in FIG. 1. Further, the loop part 21b is positioned within the plane which is roughly parallel with a plane in which the electrode portion 22 is arranged. In other words, the positive electrode portion 22 having the W shape and the loop part 21b are respectively arranged in two spaced planes which are substantially parallel with each other. By forming the loop part 21b so as to have such a structure described above, the loop part 21b can be arranged efficiently within the narrow space inside the battery box 1a.

Note that in FIG. 2c, the dashed line arrow A shows the longitudinal direction of the dry battery, and the dashed line arrow B shows a direction perpendicular to the longitudinal direction A of the battery.

Next, the operation of the positive terminal 20 for a dry battery and the battery box 1a equipped with the positive terminal 20 of this embodiment will be described.

When the battery box 1a in which a dry battery is housed (not shown in the drawing) receives vibration or shock, a force due to the vibration or shock causes the battery 1 to push against the electrode portion 12 of the positive terminal 10 in the direction of the arrow A, and as a result, the partition plate 4 bends slightly. The load due to this force bends and deforms the loop part 21b (which serves as the load absorbing means of the present invention) through the extension part 21a, so that the applied load is absorbed by the bending and deformation of the loop part 21b. At that time, a part of the load may be converted into heat energy. As a result, almost none of the load is transmitted to the soldering portion 13, and this makes it possible to prevent damage to the portion of the substrate 6 where the soldering portion 13 is positioned.

Further, because the loop part 21b is formed into a substantially ring shape as shown in the drawings, it has a restoring force which acts like a spring. Therefore, even in the case where a load due to strong vibration or shock is applied, the loop part 21b can be restored into its original shape. Further, because it is easy to manufacture such a ring shape of the loop part 21b, the present embodiment has the advantage of making it possible to reduce the manufacturing cost.

Further, since the loop part 21b also functions as a lead wire to the substrate 6 and since the loop part 21b is integrally formed with the electrode portion 22, it is possible to further reduce the manufacturing cost. Further, since the mounting operation thereof can be carried out simply by inserting the electrode portion 22 into the mounting portion 5 provided on the partition plate 4, it is possible to use a prior art assembling process without alteration.

Further, in the present embodiment described above, the loop part 21b of the present invention is formed into a substantially ring shape, but the present invention is not limited to this shape, and it is possible to use other shapes for the loop part 21b so long as those shapes make it possible to absorb a load due to vibration or shock in a manner like that described above in the operation of the present embodiment. For example, the loop part 21b may be formed into a shape in which a U-shaped bend is made continuous like the electrode portion 22 or the like, and other shapes that make it possible to achieve shock absorbing means known to those skilled in the art. Further, in the embodiment described above, only one loop part 21b was formed, but it is also possible to form a plurality of these.

Furthermore, in the embodiment described above, the battery box 1a houses one dry battery, but the battery box 1a may be the type that can house a plurality of batteries. In this case, some or all of the positive terminals thereof can be given the structure described above, respectively. Further, in the embodiment described above, the battery box 1a is connected to a device such as a MD or the like via the cable 16 and the connector 17, but it is also possible to eliminate the cable 16 and directly mount the connector 17 to the battery box 1a.

Moreover, the positive terminal for a dry battery of the present invention is not limited to the type used in a battery box like that of the embodiment described above, and of course it can be used as a terminal in products that use any kind of batteries.

Finally, it should be understood that the present invention is not limited to the embodiment described above, and it is possible to make various changes and improvements without departing from the scope and spirit of the invention defined in the appended claims.

What is claimed is:

1. A battery box for receiving at least one dry battery, the battery box comprising:
   a casing for receiving the dry battery wherein the dry battery has a cathode and an anode at opposite ends of a longitudinal direction, the casing having a first portion adjacent to the cathode and a second end portion adjacent to the anode wherein the second end portion of the casing is located in a position opposite to the first end portion of the casing and further wherein the first end portion of the casing and the second end portion of the casing are located at opposite ends of the longitudinal direction;
   a partition plate located between the first end portion of the casing and the second end portion of the casing wherein the partition plate is adjacent to the second end portion of the casing and further wherein the partition plate has a first surface facing the second end portion of the casing and a second surface located in a position opposite to the first surface;
   at least one negative terminal arranged in the first end portion of the casing to which the cathode of the dry battery is adapted to contact when the dry battery is received in the casing;
   at least one positive terminal arranged in the second end portion of the casing, the positive terminal being formed by bending a single conductive material made of a metallic wire into a predetermined shape; and
   a substrate arranged in a space defined between the first surface of the partition plate and the second end portion of the casing, wherein the positive terminal comprises:
   an electrode portion provided at a first end portion of the metallic wire to which the anode of the dry battery is adapted to contact;
   a soldering portion provided at a second end portion of the metallic wire and soldered to the substrate wherein the second end portion of the metallic wire is located in a position opposite to the first end portion of the metallic wire; and
   a lead portion provided between the electrode portion and the soldering portion, wherein the leading portion has a load absorbing means for preventing a force exerted in the longitudinal direction of the dry battery from being directly applied to the soldering portion and further wherein the lead portion has an extending portion integrally coupled to the electrode portion at a first end of the extending part wherein the extending portion extends in the longitudinal direction of the dry battery over the partition plate wherein the lead portion has a curved loop portion integrally coupled between the soldering portion and a second end of the extending portion wherein the second end of the extending part and the first end of the extending part define a length of the extending part wherein the curved loop portion is located in the space defined between the first surface of the partition plate and the second end portion of the casing wherein the curved loon portion does not contact the first surface of the partition plate.

2. The battery box of claim 1 further comprising:
   a capacitor provided on the substrate wherein the curved loop portion of the lead portion does not contact the capacitor.

3. The battery box of claim 1 further comprising:
   a substantially W-shape configuration of the electrode portion wherein the substantially W-shape configuration is obtained by bending the first end portion of the metallic wire into a W-shape so that the electron portion and the curved loop portion are respectively arranged in two spaced planes substantially parallel with each other through the partition plate.

* * * * *